(12) United States Patent
Viste et al.

(10) Patent No.: US 10,387,238 B2
(45) Date of Patent: Aug. 20, 2019

(54) INDUSTRIAL CONTROL PROGRAM SEQUENCE MONITORING

(71) Applicant: Rockwell Automation Technologies, Inc., Mayfield, OH (US)

(72) Inventors: Michael J. Viste, Grafton, WI (US); Joseph P. Izzo, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 260 days.

(21) Appl. No.: 15/292,348

(22) Filed: Oct. 13, 2016

(65) Prior Publication Data

US 2018/0081747 A1    Mar. 22, 2018

Related U.S. Application Data

(60) Provisional application No. 62/398,056, filed on Sep. 22, 2016.

(51) Int. Cl.
*G06F 11/00* (2006.01)
*G06F 11/07* (2006.01)
(Continued)

(52) U.S. Cl.
CPC ........ *G06F 11/079* (2013.01); *G05B 19/0428* (2013.01); *G05B 19/058* (2013.01);
(Continued)

(58) Field of Classification Search
CPC ............... G06F 11/079; G06F 11/3466; G06F 11/0706; G06F 11/0772; G06F 11/0751;
(Continued)

(56) References Cited

U.S. PATENT DOCUMENTS 5,844,795 A    12/1998 Johnston et al.
6,366,215 B1    4/2002 Tice et al.
(Continued)

OTHER PUBLICATIONS

Wikipedia "Modular programming page" retrieved using the Way Back machine, from https://web.archive.org/web/20160916175139/ https://en.wikipedia.org/wiki/Modular_programming (Year: 2016).*

*Primary Examiner* — Yair Leibovich
(74) *Attorney, Agent, or Firm* — Boyle Fredrickson, S.C.

(57) ABSTRACT

The present inventors have recognized that highly reliable operation may be further achieved in industrial control systems by monitoring execution of programs in real time. Such monitoring may include detecting defective program sequences which may be caused by executing a wrong sequence, executing a sequence at a wrong time, and/or a faulty clock. In one aspect, a control program may be divided into executable modules. A first code stream may then execute to control an industrial process or machine using the executable modules stored in a first set. In addition, a second code stream may execute to verify the first code stream using executable modules stored in a second set. First and second execution sequence values may be generated based on execution of the first and second code streams. A comparison of the first and second execution sequence values may detect an error which may have occurred in the program.

14 Claims, 4 Drawing Sheets

(51) Int. Cl.
  *G05B 19/042* (2006.01)
  *G05B 19/05* (2006.01)
  *G06F 11/34* (2006.01)
  *G05B 23/02* (2006.01)
  *G06F 11/32* (2006.01)

(52) U.S. Cl.
  CPC ...... *G06F 11/0706* (2013.01); *G06F 11/0751* (2013.01); *G06F 11/0772* (2013.01); *G06F 11/3466* (2013.01); *G05B 19/056* (2013.01); *G05B 23/0237* (2013.01); *G05B 2219/14112* (2013.01); *G05B 2219/24194* (2013.01); *G06F 11/328* (2013.01)

(58) Field of Classification Search
  CPC . G06F 11/328; G05B 19/058; G05B 19/0428; G05B 19/056; G05B 23/0237; G05B 2219/24194; G05B 2219/14112
  USPC .......................................................... 714/57
  See application file for complete search history.

(56) References Cited

U.S. PATENT DOCUMENTS

| | | | |
|---|---|---|---|
| 7,143,366 B1 | 11/2006 | McKelvey et al. | |
| 7,877,627 B1 * | 1/2011 | Freydel | G06F 11/182 714/11 |
| 2002/0046365 A1 * | 4/2002 | Avizienis | G06F 11/2028 714/43 |
| 2002/0152256 A1 | 10/2002 | Wetzel et al. | |
| 2008/0163182 A1 | 7/2008 | Breault | |
| 2019/0012256 A1 * | 1/2019 | Poppe | G01R 31/31903 |

* cited by examiner

INDUSTRIAL CONTROL PROGRAM SEQUENCE MONITORING

CROSS-REFERENCE TO RELATED APPLICATIONS

This application claims priority to U.S. Provisional Patent Application No. 62/398,056, entitled "Industrial Control Program Sequence Monitoring," filed on Sep. 22, 2016, which is herein incorporated by reference.

FIELD OF THE INVENTION

The present invention relates generally to industrial control programs, and more particularly, to a system for verifying reliable operation of an industrial control program in an industrial control system.

BACKGROUND OF THE INVENTION

Industrial controllers are specialized computer systems used for the control of industrial processes or machinery, for example, in a factory environment. Generally, an industrial controller executes a stored control program that reads inputs from a variety of sensors associated with the controlled process or machine and, sensing the conditions of the process or machine, and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Generally, industrial controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, EtherNet/IP, DeviceNet and ControlNet) differ from standard communication networks (such as Ethernet) by guaranteeing maximum communication delays by pre-scheduling the communication capacity of the network, and/or providing redundant communication capabilities for high-availability.

As part of their enhanced modularity, industrial controllers may employ I/O modules or devices dedicated to a particular type of electrical signal and function, for example, detecting input AC or DC signals or controlling output AC or DC signals. Each of these I/O modules or devices may have a connector system allowing them to be installed in different combinations in a housing or rack along with other selected I/O modules or devices to match the demands of the particular application. Multiple or individual I/O modules or devices may be located at convenient control points near the controlled process or machine to communicate with a central industrial controller via the control network.

It is important to ensure highly reliable operation of industrial control systems. Such highly reliable operation may be important for ensuring the system consistently operates as expected, for example, in order to maximize functional safety, minimize costly downtime, and the like. An ongoing need therefore exists to ensure that industrial controllers and industrial control systems operate consistently with the highest reliability attainable.

SUMMARY OF THE INVENTION

The present inventors have recognized that highly reliable operation may be further achieved in industrial control systems by monitoring execution of programs in real time. In one aspect, a control program may be divided into executable modules. A first code stream may then execute to control an industrial process or machine using the executable modules stored in a first set. In addition, a second code stream may execute to verify the first code stream using executable modules stored in a second set. First and second execution sequence values may be generated based on execution of the first and second code streams. A comparison of the first and second execution sequence values may detect an error which may have occurred in the program.

Accordingly, functional safety for controllers may be provided by detecting an occurrence of a defective program sequence. A defective program sequence may exist if individual elements of a program (for example software modules, subprograms or commands) are processed in the wrong sequence or period of time, or if the clock of the processor is faulty.

In one aspect, a user subroutine may be transformed into a control flow graph consisting of connections between basic blocks. The system may process these blocks to form executable modules in a formally established sequence based on the control flow graph. The sequence can change at runtime based on program state when there are control path diverges, such as for jump ("JMP") instructions or self-terminating loops. First and second code streams may each execute the same program having the same executable modules in first and second sets, respectively. Moreover, the first and second code streams may execute in series or parallel. Each executable module may log its execution, and at the end of every scan, the logs may be analyzed to ensure each execution was carried out in a substantially identical manner. Examining the logs for duplicate entries may help to ensure temporal and logical sequence monitoring has been established.

Accordingly, a system for verifying proper execution of a program in an industrial control system may be provided. This may be desirable for detecting a fault with respect to the program in a high reliability system. For example, a user subroutine, which could be, for example, source code for an industrial control program written in relay ladder logic, may be transformed into a control flow graph consisting of connections between "basic blocks." A basic block may be a section of code determined to execute together without divergence (such as sections of code between jumps and/or jump targets). From the basic blocks, first and second sets of discrete corresponding "code sections" may be provided with or without further processing. The first and second sets of code sections may be identical, or may include certain variations which may be desirable as known in the art. The first and second sets of code sections may then be converted into corresponding first and second sets of discrete relocatable object files, which may, in turn, be transferred to an industrial controller and linked to form corresponding first and second sets of discrete executables. The first and second sets of executables may then execute independently in first and second code streams.

In one aspect, execution of the first code stream may operate to control an industrial process, whereas execution of the second code stream may operate to verify the integrity of the first code stream. Execution of the first and second sets of executables in the first and second code streams may generate first and second execution sequence values, respectively, with such execution sequence values indicating: (1) discrete executables which have been executed in the respective code stream, and (2) the order in which the discrete executables have been executed. Execution sequence values may be calculated, for example, using predetermined identifiers assigned to the code sections, and, in turn, the corresponding object files and executables, and by continuously updating error detecting or integrity codes, such as cyclic redundancy check (CRC) calculations, after execution of each executable. Upon completion of execution of the first and second code streams, the first and second execution sequence values may be compared so that any mismatch, which may indicate an undesirable fault, may be detected and appropriate action, such as sending a message alert and/or stopping one or more aspects of the industrial control process, may be taken.

Specifically then, one aspect of the invention may provide an industrial controller including: a processor executing a program stored in a non-transient medium operable to: (a) store first and second sets of executable modules; (b) execute first and second code streams comprising executable modules of the first and second sets of executable modules, respectively, in which the first code stream is operable to control an industrial process or machine; (c) determine first and second execution sequence values corresponding to the first and second code streams, respectively, in which each of the first and second execution sequence values indicates: (i) an identification of executable modules executed in the code stream; and (ii) an order of execution of executable modules executed in the code stream; and (d) upon determining a mismatch between the first and second execution sequence values, generate an output indicating the mismatch.

Another aspect of the invention may provide a method for operating an industrial controller having a processor executing a program stored in a non-transient medium including: (a) storing first and second sets of executable modules; (b) executing first and second code streams comprising executable modules of the first and second sets of executable modules, respectively, in which the first code stream controls an industrial process or machine; (c) determining first and second execution sequence values corresponding to the first and second code streams, respectively, in which each of the first and second execution sequence values indicates: (i) an identification of executable modules executed in the code stream; and (ii) an order of execution of executable modules executed in the code stream; and (d) upon determining a mismatch between the first and second execution sequence values, generating an output indicating the mismatch.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
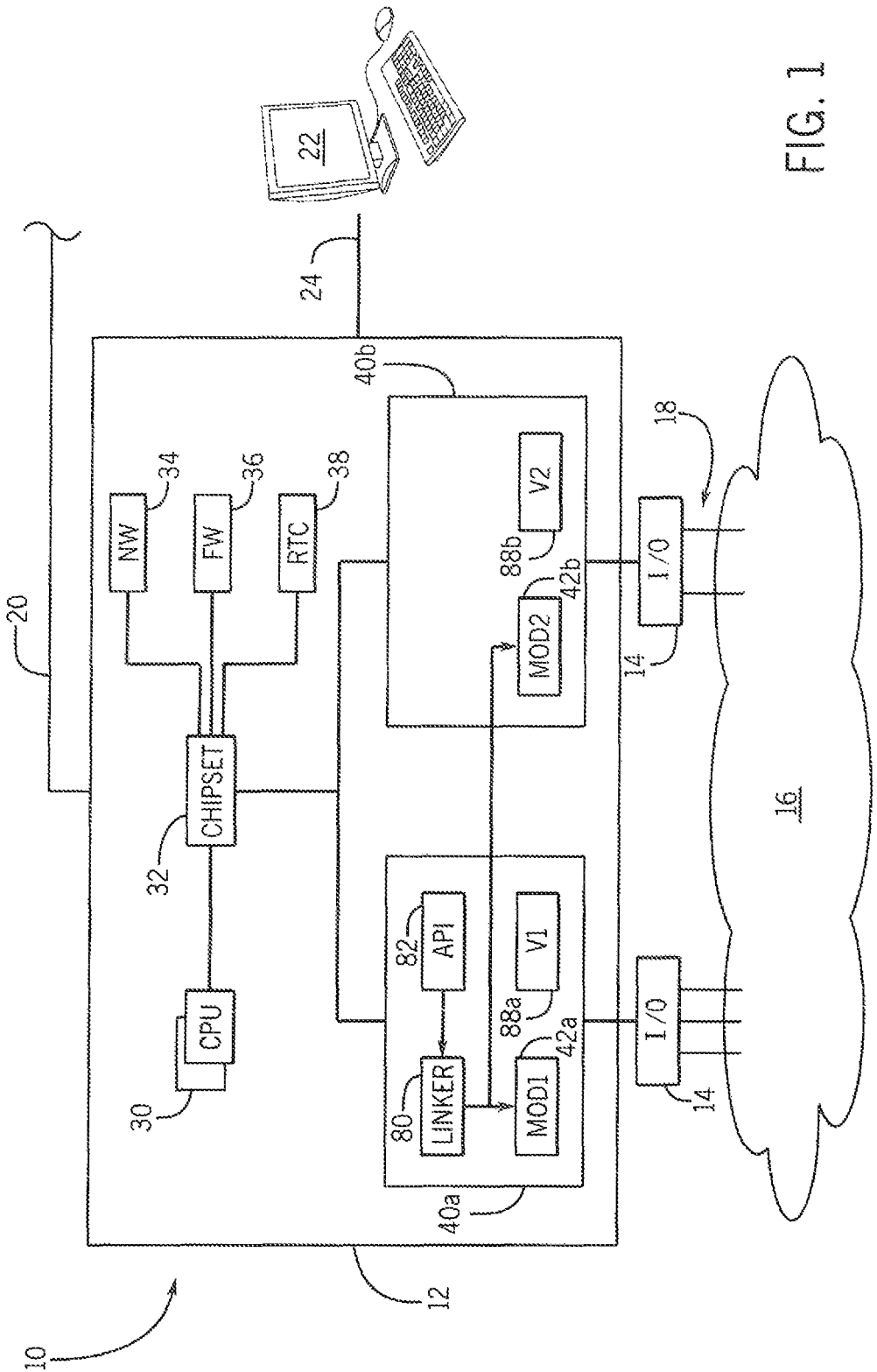
FIG. 1 is an exemplar industrial control system executing first and second code streams in accordance with an aspect of the invention.

Referring now to FIG. 1, an exemplar industrial control system 10 may include an a control device 12, which may be an industrial controller, such as a Programmable Logic Controller (PLC), in communication with one or more control I/O modules 14 for controlling an industrial process or machine 16. The control device 12 may execute a control program stored in a non-transient medium to control the I/O modules 14. The I/O modules 14, in turn, may be in communication with sensors and/or actuators in the industrial process or machine 16 via I/O lines 18, which may be connected to the I/O modules 14 via screw terminals. The control device 12 may also be in communication with other industrial controllers, switches, routers, gateways and/or networks via a first network 20, which may be a control network (such as an EtherNet/IP, DeviceNet and ControlNet network) suitable for highly reliable and available real-time communication. The control device 12 may further be in communication with a Human Machine Interface (HMI) or workstation 22, which may also occur over the first network 20, or over a second network 24 as shown, which could also be a control network.

The control device 12 may include, among other things, one or more multi-core Central Processing Units (CPU's) 30 in communication with a chipset 32 and, in turn, network interface devices 34 (for communicating with the I/O modules 14, the first network 20 and/or the second network 24), firmware 36 (for configuring the control device 12), a real-time clock (RTC) 38 (a computer clock which may be in the form of an integrated circuit for keeping track of the current time) and a memory 40 (which may include a Dynamic Random Access Memory (DRAM) and/or Static Random Access Memory (SRAM)).

In one aspect, the memory 40 may include a first memory 40a, which may be a first integrated circuit for storing a first set of executable modules 42a, and a second memory 40b, which may be a second integrated circuit for storing a second set of executable modules 42b, as will be described. The first and second sets of executable modules 42a and 42b, respectively, may be identical sets of code, though in some aspects variations between one another may be provided for achieving certain enhancements. In operation, the first set of executable modules 42a may be accessed by the CPU 30 to execute a first code stream which may be used to accomplish a useful function in the system 10, such as control of the industrial process or machine 16. The second set of executable modules 42b may be accessed by the CPU 30 (which may be the same or different CPU 30) to execute a second code stream which may be used to verify the first code stream in order to detect a defective program sequence.

Figure 2:
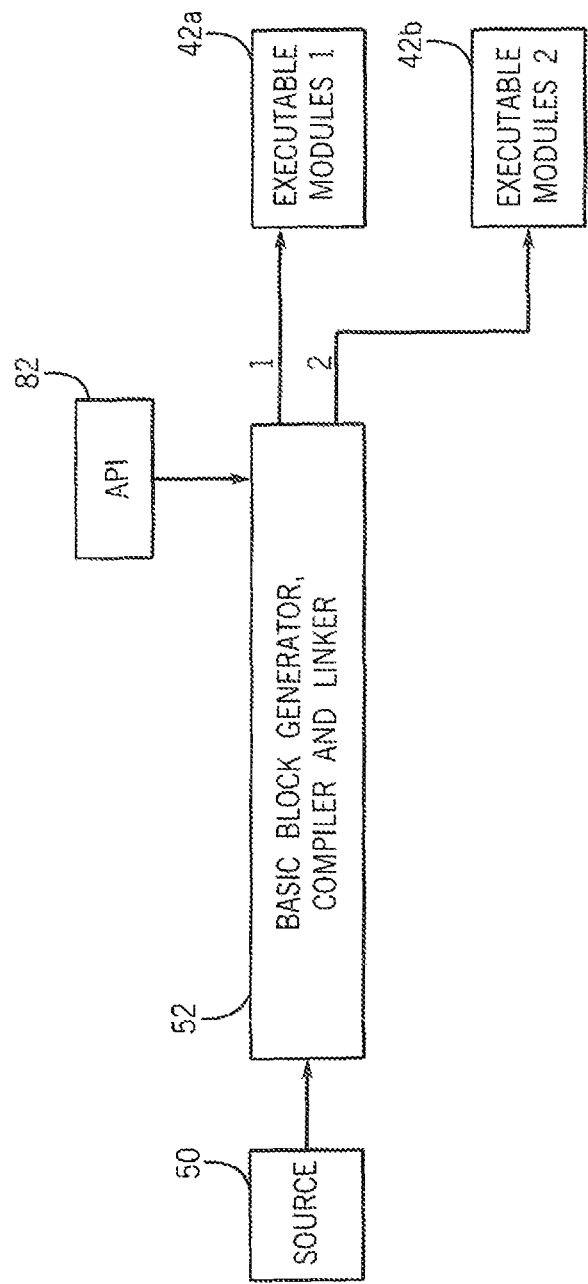
FIG. 2 is a flow chart for the system of FIG. 1.

With additional reference to FIG. 2, the first and second sets of executable modules 42a and 42b, respectively, may originate from common source code 50, which could be provided by the workstation 22. The source code 50 could be any user code or subroutines written for execution on the control device 12 and/or the I/O modules 14, such as the control program. The source code 50 may be written, for example, in Relay Ladder Logic (RLL), a well-known programming language for industrial control, as shown in FIG. 3.

Once the source code 50 is prepared, the source code 50 may be provided to a basic block generator and compiler 52 (which may execute on the workstation 22) for generating basic blocks 54 from the source code 50. A basic block 54 may be a section of code determined to execute together without divergence, such as sections of code between branches (such as "JMP" or jump instructions) and/or branch targets (such as "LBL" or label addresses).

Figures 3, 4:
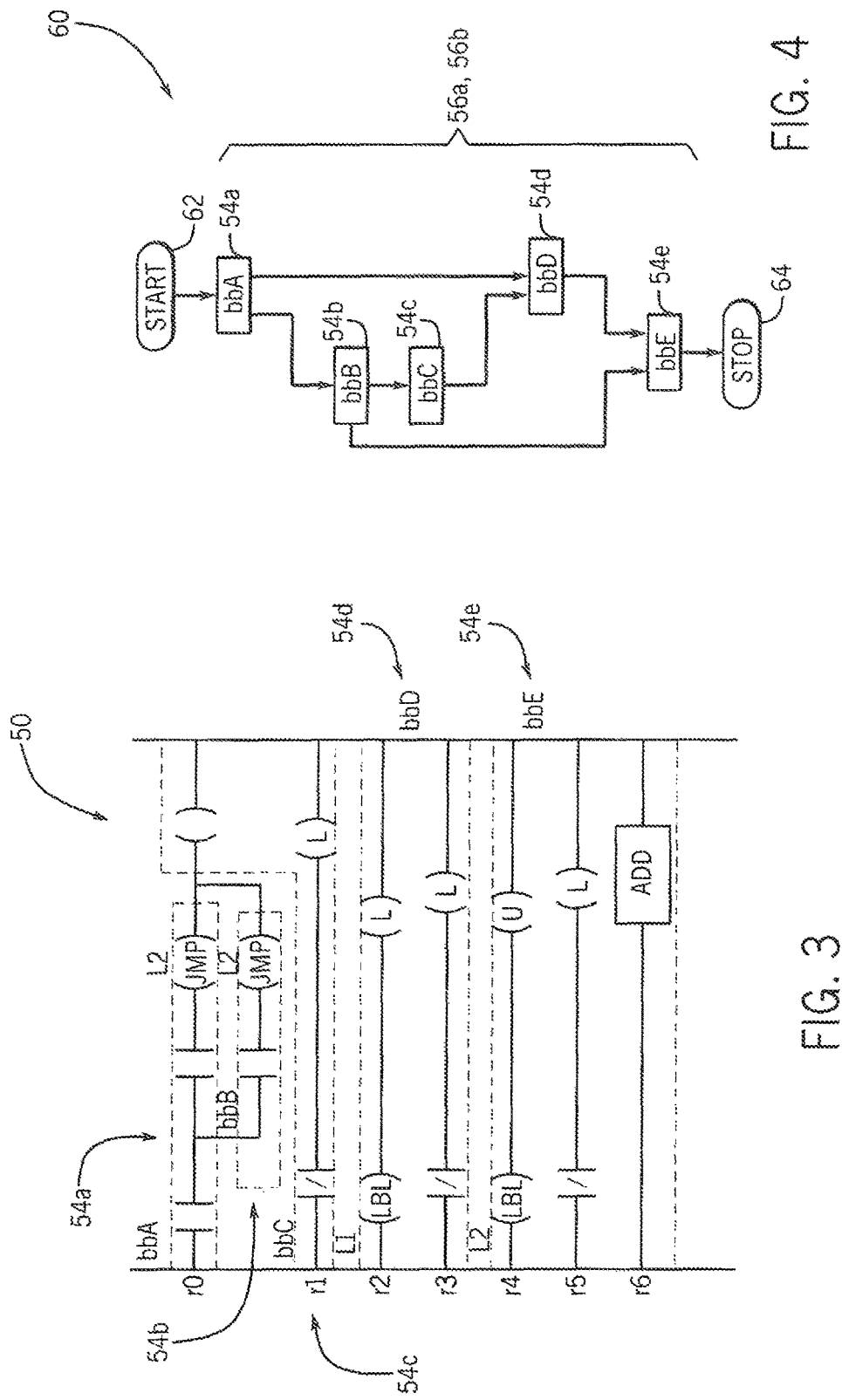
FIG. 3 is exemplar source code.
FIG. 4 is an exemplar control flow graph for the source code of FIG. 4.

As illustrated in FIG. 3 by way of example, the source code 50 may include: a basic block 54a (shown as "bbA"); a basic block 54b (shown as "bbB"); a basic block 54c (shown as "bbC"); a basic block 54d (shown as "bbD"); and a basic block 54e (shown as "bbE"). Accordingly, as illustrated in FIG. 4 by way of example, a control flow graph 60 may be generated consisting of connections between the basic blocks 54 (in a set of basic blocks 56), with their corresponding divergence paths, between a start point 62 and a stop point 64. For example, the start point 62 may lead to the basic block 54a, which could lead to either the basic block 54b or the basic block 54d. The basic block 54b could lead to either the basic block 54c or the basic block 54d. The basic block 54c leads to the basic block 54d, the basic block 54d leads to the basic block 54e, and the basic block 54e leads to the stop point 64. Moreover, the aforementioned basic blocks 54 may repeat one or more times depending on conditions for the basic block 54 (such as self-terminating loops). As a result, a number of possible flow directions, sequences and timings may be achieved according to the control flow graph 60.

Referring again to FIG. 2, upon generation of the basic blocks 54, first and second sets of basic blocks 56a and 56b, respectively (shown as having identical sets of basic blocks 54 in FIG. 4 for simplicity, and by way of example), may be provided to a compiler 66. The compiler 66 may be operable to complete one or more steps, including: transformation of the first and second sets of basic blocks 56a and 56b, respectively, by grouping the first and second sets of basic blocks 56a and 56b, respectively, for improved efficiency; and/or generation of first and second sets of object files corresponding to the first and second sets of basic blocks 56a and 56b, respectively.

Upon generation of the first and second sets of object files, such object files may be relocatable to another system, such as the control device 12, for linking. The linking may link each of the first and second sets of object files with one or more Application Program Interfaces (API's) 82, libraries and/or other elements, for generating the first and second sets of executable modules 42a and 42b, respectively.

Figure 5:
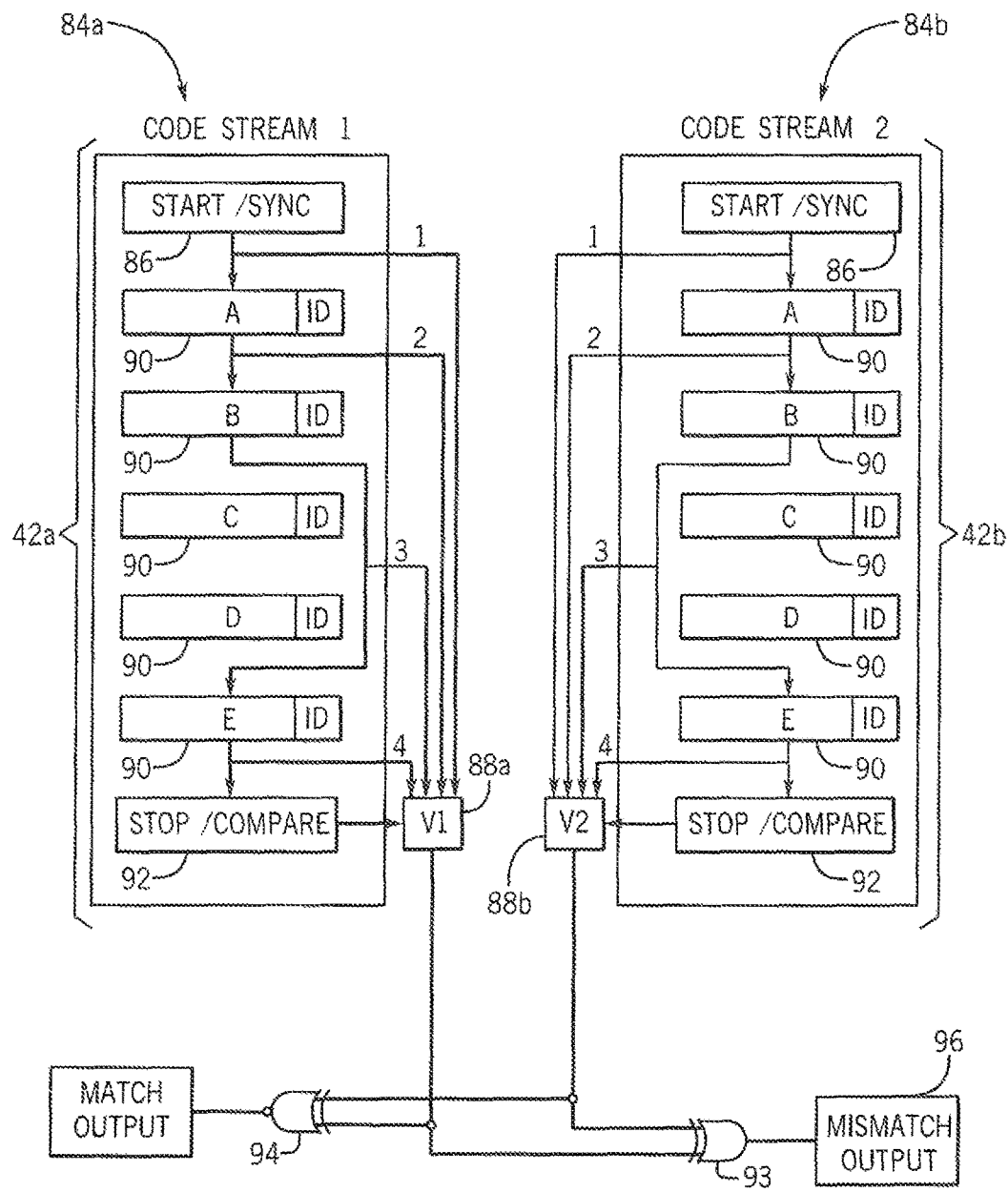
FIG. 5 is an exemplar execution flow for the first and second code streams of FIG. 1.

Referring now to FIG. 5, in operation, the CPU 30 may access the first set of executable modules 42a stored in the first memory 40a and the second set of executable modules 42b stored in the second memory 40b. The first and second sets of executable modules 42a and 42b, respectively, may be accessed for execution by the same CPU 30 or may be accessed for execution by different CPU's 30 altogether. The CPU 30 may execute first and second code streams 84a and 84b, respectively, comprising executable modules of the first and second sets of executable modules 42a and 42b, respectively. The CPU 30 may execute the first and second code streams 84a and 84b, respectively, serially, or in parallel for increased performance. In one aspect, the first code stream 84a may be operable to control the industrial process or machine 16, via the I/O modules 14 (and the I/O lines 18), while the second code stream 84b may be operable to provide verification for the first code stream 84a.

During execution of the first and second code streams 84a and 84b, respectively, the CPU 30 may calculate first and second execution sequence values 88a and 88b, respectively, corresponding to the first and second code streams 84a and 84b, respectively. The first and second execution sequence values 88a and 88b, respectively, may be determined to indicate an identification of executable modules executed in the code stream, and an order of execution of the executable modules executed in the code stream. This may be accomplished, for example, by tracking identifiers (ID) 90 associated with the executable modules as each executable module is executed. In one aspect, the first and second execution sequence values 88a and 88b, respectively, may be determined by calculating error detecting or integrity codes, such as cyclic redundancy check (CRC) value, using the identifiers 90, which values may be continuously updated upon execution of each executable module.

Accordingly, upon the first and second code streams 84a and 84b, respectively, reaching a common stop or compare point 92, the first and second execution sequence values 88a and 88b may be compared for determining a mismatch via mismatch logic 93 function in which a single output is asserted if all inputs fail to match and/or a match via match logic 94 function in which a single output is asserted if all inputs successfully match. If a mismatch is detected, such as via the mismatch logic 93, a mismatch output 95 may be generated in the system 10, which may operate to provide several functions, such as modifying an operation of the industrial process or machine 16 (such as stopping all motion), sending an alert to a user (such as via the workstation 22 or a mobile device), and the like. However, if a match is detected, such as via the match logic 94, a match output 96 may be generated in the system 10, which may operate to provide several functions, such as continuing to execution of the next code streams, sending a match confirmation to a user (such as via the workstation 22), and the like.

As illustrated in FIG. 5 by way of example, the first code stream 84a may execute the executable module "A" (which originated from the basic block 54a or "bbA"), and may calculate the first execution sequence value 88a using the identifier 90 of the executable module "A" The second code stream 84b may also execute the executable module "A" (which also originated from the basic block 54a or "bbA"), and may calculate the second execution sequence value 88b using the identifier 90 of the executable module "A". Then, the first code stream 84a may execute the executable module "B" (which originated from the basic block 54b or "bbB"), and may update calculation of the first execution sequence value 88a using the present value and the identifier 90 of the executable module "B". At about the same time, the second code stream 84b may also execute the executable module "B" (which also originated from the basic block 54b or "bbB"), and may update calculation of the second execution sequence value 88b using the present value and the identifier 90 of the executable module "B". Then, the first code stream 84a may branch to execute the executable module "E" (which originated from the basic block 54e or "bbE"), and may update calculation of the first execution sequence value 88a using the present value and the identifier 90 of the executable module "E". At about the same time, the second code stream 84b may also branch to execute the executable module "E" (which also originated from the basic block 54e or "bbE"), and may update calculation of the second execution sequence value 88b using the present value and the identifier 90 of the executable module "E". Then, upon the first and second code streams 84*a* and 84*b*, respectively, reaching the compare point 92, the first and second execution sequence values 88*a* and 88*b* may be compared for determining a mismatch via mismatch logic 93 (or a match via the match logic 94).

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention: The embodiments described herein explain the best modes known for practicing the invention and will enable others skilled in the art to utilize the invention. All of the publications described herein including patents and non-patent publications are hereby incorporated herein by reference in their entireties.

What is claimed is:

1. An industrial control device comprising:
   a processor executing a program stored in a non-transient medium operable to:
   (a) store first and second sets of executable modules;
   (b) execute first and second code streams comprising executable modules of the first and second sets of executable modules, respectively, wherein the first code stream is operable to control an industrial process or machine;
   (c) determine first and second execution sequence values corresponding to the first and second code streams, respectively, wherein each of the first and second execution sequence values indicates:
      (i) an identification of executable modules executed in the code stream; and
      (ii) an order of execution of executable modules executed in the code stream; and
   (d) upon determining a mismatch between the first and second execution sequence values, generate an output indicating the mismatch,
   wherein the executable modules are divided according to branches, and
   wherein the first and second sets of executable modules originate from common source code,
   wherein the executable modules provide tracking identifiers, and
   wherein the first and second execution sequence values are determined by calculating first and second error detecting codes, respectively, using the tracking identifiers.

2. The control device of claim 1, wherein the first and second error detecting codes are continuously updated upon execution of each executable module.

3. The control device of claim 1, wherein the first and second execution sequence values are compared for the mismatch upon completion of the first and second code streams.

4. The control device of claim 1, further comprising the first and second sets of executable modules being identical.

5. The control device of claim 4, wherein the first and second sets of executable modules are stored separately in first and second integrated circuits, respectively.

6. The control device of claim 1, wherein the output is operable to modify an operation of the industrial process or machine.

7. The control device of claim 1, further comprising, upon determining a match between the first and second execution sequence values, generate a second output indicating the match.

8. A method for operating a control device having a processor executing a program stored in a non-transient medium comprising:
   (a) storing first and second sets of executable modules;
   (b) executing first and second code streams comprising executable modules of the first and second sets of executable modules, respectively, wherein the first code stream controls an industrial process or machine;
   (c) determining first and second execution sequence values corresponding to the first and second code streams, respectively, wherein each of the first and second execution sequence values indicates:
      (i) an identification of executable modules executed in the code stream: and
      (ii) an order of execution of executable modules executed in the code stream; and
   (d) upon determining a mismatch between the first and second execution sequence values, generating an output indicating the mismatch,
   wherein the executable modules are divided according to branches, and
   wherein the first and second sets of executable modules originate from common source code,
   wherein the executable modules provide tracking identifiers, and
   further comprising determining the first and second execution sequence values by calculating first and second error detecting codes, respectively, using the tracking identifiers.

9. The method of claim 8, further comprising continuously updating the first and second error detecting codes upon execution of each executable module.

10. The method of claim 8, further comprising comparing the first and second execution sequence values for the mismatch upon completion of the first and second code streams.

11. The method of claim 8, further comprising the first and second sets of executable modules being identical.

12. The method of claim 11, further comprising storing the first and second sets of executable modules separately in first and second integrated circuits, respectively.

13. The method of claim 8, further comprising modifying an operation of the industrial process or machine using the output.

14. The method of claim 8, further comprising, upon determining a match between the first and second execution sequence values, generating a second output indicating the match.

* * * * *